Figure 1:
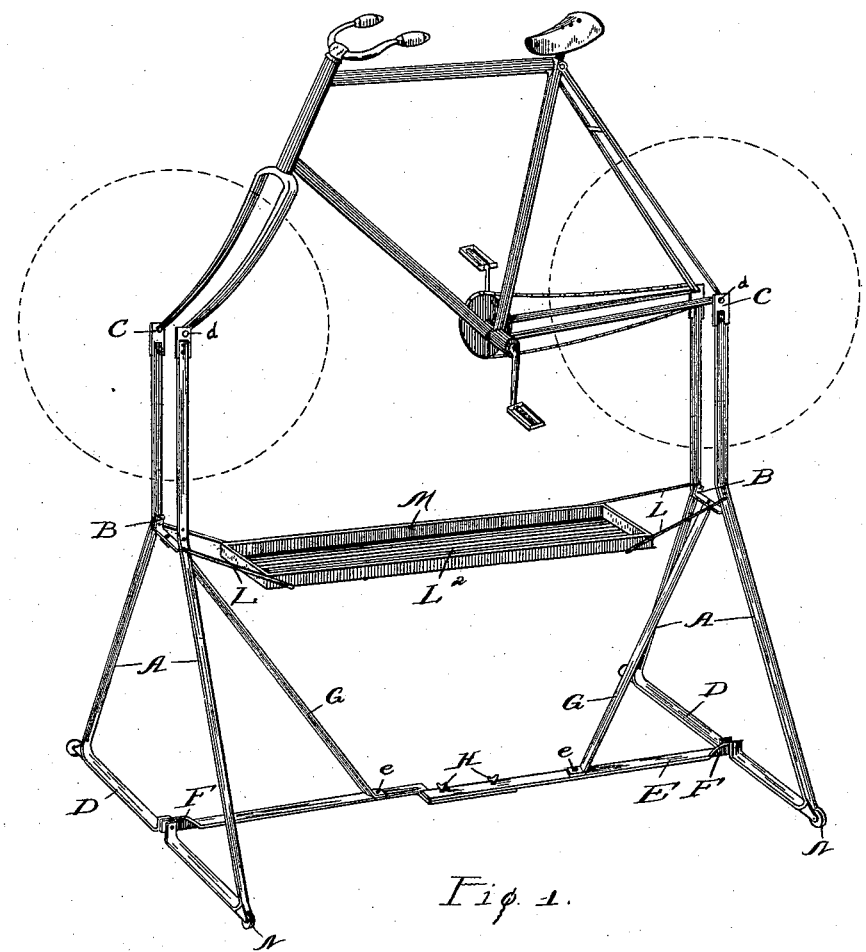

(No Model.)

A. L. & G. A. BANKER.
BICYCLE STAND.

No. 588,376.                               Patented Aug. 17, 1897.

Witnesses
Francis H. Anglin
A. M. Wilson

Inventors
Arthur L. Banker
George A. Banker
By Henry C. Evert Attorney

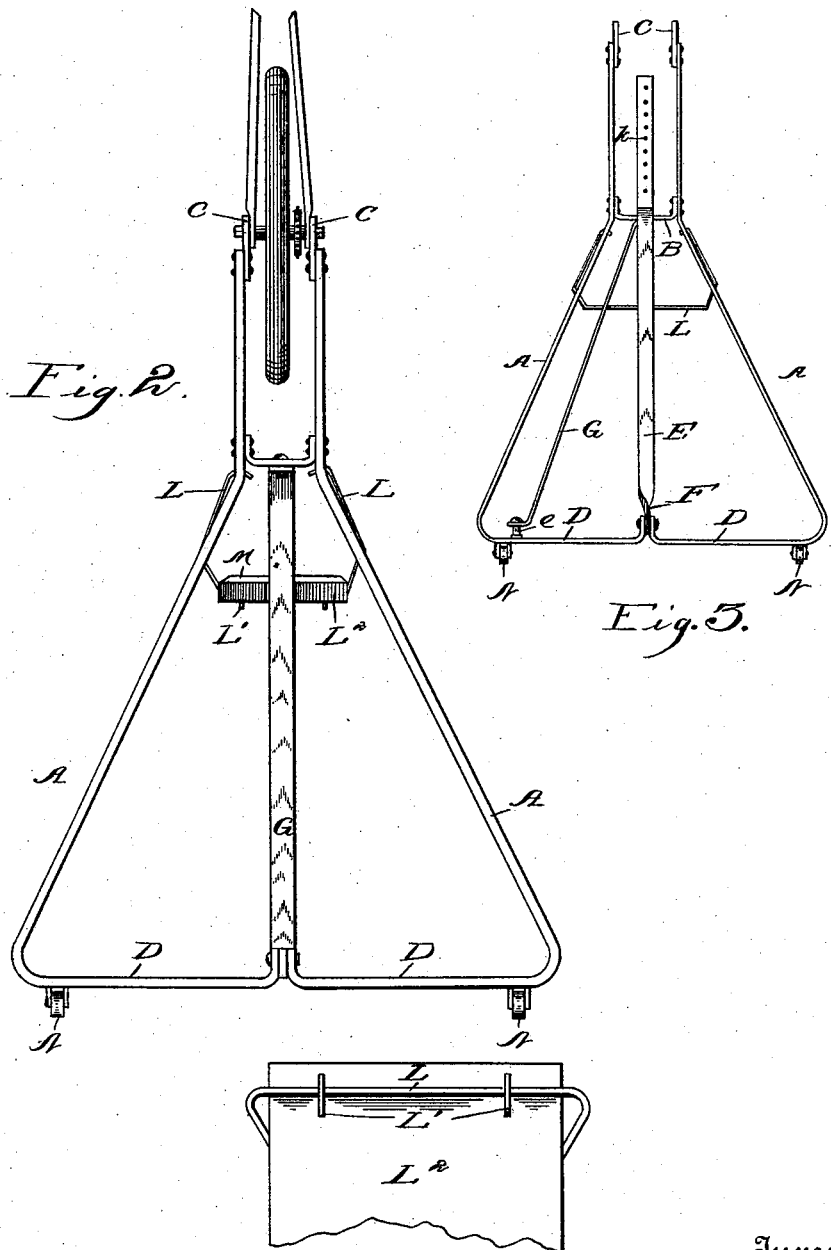

UNITED STATES PATENT OFFICE.

ARTHUR L. BANKER AND GEORGE A. BANKER, OF PITTSBURG, PENNSYLVANIA.

BICYCLE-STAND.

SPECIFICATION forming part of Letters Patent No. 588,376, dated August 17, 1897.

Application filed January 2, 1897. Serial No. 617,817. (No model.)

*To all whom it may concern:*

Be it known that we, ARTHUR L. BANKER and GEORGE A. BANKER, citizens of the United States of America, residing at Pittsburg, in the county of Allegheny and State of Pennsylvania, have invented certain new and useful Improvements in Bicycle-Stands, of which the following is a specification, reference being had therein to the accompanying drawings.

This invention relates to certain new and useful improvements in bicycle-stands, and is particularly adapted for use as a display-stand for exhibition purposes.

The invention has for its object to construct a stand of the above-described class that will be adjustable to any length of wheel-base, and provided with an exhibition-board, which moves automatically with the adjustment of the stand; furthermore, to provide a stand comprising the above features that will fold in a neat and compact manner for shipment or storage.

The invention further aims to construct a stand that will be extremely simple in its construction, strong, durable, effectual in its operation, and comparatively inexpensive to manufacture; still further, to provide a stand in which the bicycle may be held without the removal of the axle-nuts.

With the above and other objects in view the invention finally consists in the novel construction, combination, and arrangement of parts to be hereinafter more specifically described, and particularly pointed out in the claims.

In describing the invention in detail reference is had to the accompanying drawings, forming a part of this specification, and wherein like letters of reference indicate similar parts throughout the several views, in which—

Figure 1 is a perspective view of our improved stand, displaying a bicycle thereon. Fig. 2 is an end view of the same. Fig. 3 is a plan view of one end, showing manner of folding. Fig. 4 is an underneath plan view of a portion of the display or exhibition board.

Referring to the drawings by reference-letters, A A represent the standards, inclined toward the top for some distance, where they are connected by U-shaped yokes B, said standards extending vertically from this point and provided with plates C C on their upper ends, said plates having apertures $d\ d$, which receive the nut and axle of the bicycle. The horizontal portions D D of the standards A A are pivotally connected to a bar E, twisted near its intersection with the bars D D, as shown at F, and extending in alinement with the stand.

A brace G is secured to the bar E by a bolt $e$, and connects the bar E to the yoke B, said bar being depressed near its inner end to receive the bar of the opposite end, said bars being secured together by set-screws H H and provided with a series of apertures K K to permit the lateral adjustment of the stand. Secured to the standards A A at or near the inner section of the inclined and vertical portions are yokes L L, engaging L-shaped hooks L′, secured in the underneath face of the display-board L² near each end thereof, said board being provided with a rim M to prevent the articles rolling from the board. The stand is supported by casters or rollers N N at each corner.

In practice we have found flat steel to be the most desirable material from which to construct the stand, though we do not wish to limit ourselves to this construction, as wood, heavy wire, tubing, or other material may be used.

In order to place the wheel in the stand, the vertical portions of the standards are forced apart, which by reason of their being connected by the yoke at the intersection of the inclined portion will force the inclined portions slightly together. The wheel is placed between the standards with the axle and nuts engaging in the apertures of the plates C C, said plates engaging the hub when the force is relieved and holding the wheel firmly in position.

As the wheel-base is shortened or lengthened by moving the set-screws H H in the bar E the display-board adjusts itself automatically to conform to the length of the stand, and when it is desired to fold the stand the set-screws H H are loosened, the brace G detached from the bars E E by removing the bolt $e$, when this brace can be moved round in alinement with the standards A A, and the bars E folded up against the yokes B. The two portions and the display-board can then be placed together and will form a neat and compact package for storage or transportation.

We desire to call particular attention to the display-board, as in displaying wheels it is very desirable to have a convenient place to exhibit the different parts of the wheel, many of which are in the unfinished state, to show the manner of constructing the same, and this board permits the exhibitor to have these parts at hand at the desired time. Furthermore, in most stands in which the wheel is suspended the nuts have to be removed from the axles, thus requiring the same being placed in position if the wheel is removed from the stand. In our construction the plates C C engage over these nuts without removing the same and preventing the frequent disalinement of the wheels caused by the tampering with the axle-nuts.

Having fully described our invention, what we claim as new, and desire to secure by Letters Patent, is—

1. In a bicycle-stand, consisting of standards, yokes connecting the standards intermediate their length, means for fastening the ends of the standard and the adjusting-bar, and braces detachably secured to the yoke and adjusting-bar, swinging brackets supporting an automatic adjustable display-board, substantially as shown and described.

2. In a bicycle-stand, standards having parallel arms, said arms having plates on their upper ends and securely held in place by a U-shaped yoke, a detachable adjusting-rod, braces detachably secured to said yoke and adjusting-rod, an automatic adjustable display-board secured to said standards, and supporting-casters for said stand substantially as shown and described.

In testimony whereof we affix our signatures in presence of two witnesses.

ARTHUR L. BANKER.
GEORGE A. BANKER.

Witnesses:
A. M. WILSON,
H. C. EVERT.